United States Patent [19]

Röss et al.

[11] Patent Number: 5,765,667
[45] Date of Patent: Jun. 16, 1998

[54] BRAKE DISK AND METHOD OF MAKING SAME

[75] Inventors: Karl-Heinz Röss, Ebersbach; Reinhard Weller, Althütte, both of Germany

[73] Assignee: Mercedes-Benz AG, Stuttgart, Germany

[21] Appl. No.: 601,674

[22] Filed: Feb. 15, 1996

[30] Foreign Application Priority Data

Feb. 20, 1995 [DE] Germany ............... 19 505 724.4

[51] Int. Cl.⁶ .................................................... R60T 7/12
[52] U.S. Cl. ................................... 188/218 XL; 29/559
[58] Field of Search .................... 188/218 XL, 218 R, 188/70 R, 18 A, 264 R, 264 A, 264 AA; 29/894.323, 418, 559, 233

[56] References Cited

U.S. PATENT DOCUMENTS

| | | | |
|---|---|---|---|
| 2,587,047 | 2/1952 | Kelley | 188/218 XL X |
| 3,378,114 | 4/1968 | Hollins | 188/218 XL |
| 4,177,883 | 12/1979 | Margetts | 188/218 XL |
| 5,028,494 | 7/1991 | Tsujimura et al. | 428/614 |
| 5,183,632 | 2/1993 | Kiuchi et al. | 419/48 |
| 5,325,951 | 7/1994 | Farinacci et al. | 188/218 XL |
| 5,372,222 | 12/1994 | Rhee et al. | 188/218 XL |
| 5,385,216 | 1/1995 | Kulczycki | 188/70 R |
| 5,544,726 | 8/1996 | Topouzian et al. | 188/218 XL X |

FOREIGN PATENT DOCUMENTS

| | | |
|---|---|---|
| 0143264A1 | 6/1985 | European Pat. Off. |
| 2479382 | 10/1981 | France . |
| 81 06029 | 10/1981 | France . |
| 23 08 256 | 9/1974 | Germany . |
| 3335807A1 | 4/1985 | Germany . |
| 709406.1 | 10/1987 | Germany . |
| 3800502A1 | 1/1989 | Germany . |
| 3835637A1 | 4/1990 | Germany . |
| 62-124244 | 6/1987 | Japan . |
| WO95/01519 | 1/1995 | WIPO . |

OTHER PUBLICATIONS

British Search Report, Apr. 17, 1996, Great Britain.
Bauteile aus Druckguss wirtschaftlich un leich, pp. 75, 76, Fertigungstechnik, 1990.
Faserverbundkeramik–Entwicklung und Einsatzmöglichkeiten, pp. 48–55, MAN Technologie Aug. 12, 1993.
Search Report, Oct. 11, 1996, France.

*Primary Examiner*—Robert J. Oberleitner
*Assistant Examiner*—Josie Ballato
*Attorney, Agent, or Firm*—Evenson McKeown Edwards & Lenahan, PLLC

[57] ABSTRACT

The invention relates to a hat-shaped brake disc made from a castable metal for vehicle wheels. It has, within the friction ring, a nave with a nave casing and nave bottom, the latter having screw-passage holes for screwing the brake disc to the wheel hub. The friction ring contains indentations rounded out on both sides in the region of transition to the nave casing. The brake disc consists completely, up to and including that immediate surface of the friction ring which is subjected to frictional stress during braking, of a particle reinforced composite aluminum material with intercalated hard-material particles of ceramic, particularly of aluminum oxide or silicon carbide (so-called Al-MMC=Aluminum-Metal-Matrix-Composite) and/or of a hypereutectic Al/Si alloy with intercalated silicon crystals. It is designed and produced as a die casting, all the surface parts of the casting being cast with a very small shape and dimension deviation. Only the frictionally-stressed surfaces of the friction ring and, where appropriate, a frictionally-stressed hollow-cylindrical brake surface inside the nave need to be machined by cutting. A radially projecting flange is arranged on the outside of the nave at the transition from the nave bottom to the nave casing, via which flange the brake disc can be secured axially in or on a workpiece holder during machining.

20 Claims, 2 Drawing Sheets

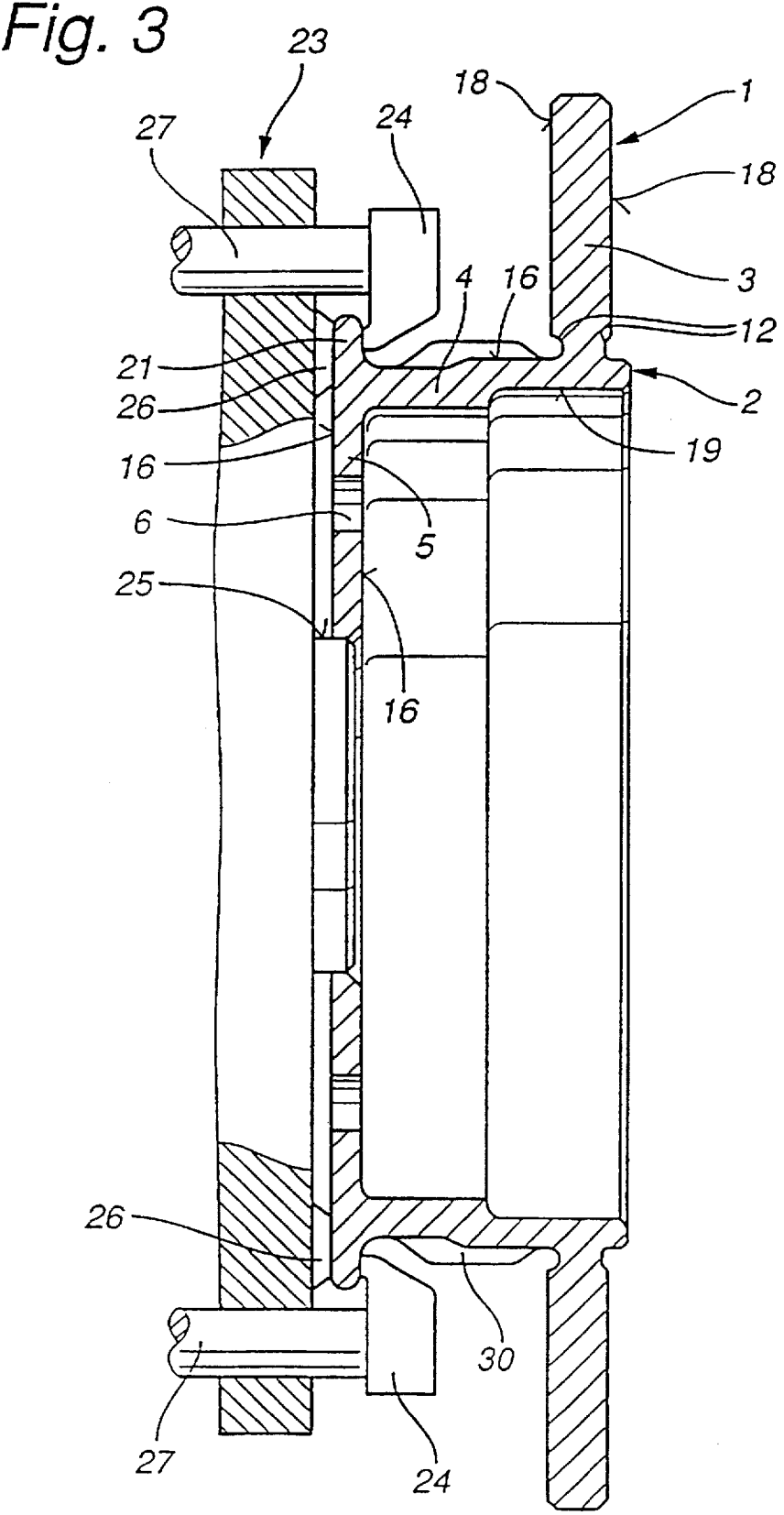

BRAKE DISK AND METHOD OF MAKING SAME

BACKGROUND AND SUMMARY OF THE INVENTION

The invention relates to a cast brake disc. German Patent Documents DE 3,800,502 Al; DE 2,308,256 C3; and DE 3,835,637 disclose brake discs of the general type which the present invention is directed toward improving.

Known brake discs consist of grey cast iron which has outstanding friction properties on account of the intercalated graphite. However, a disadvantage of grey cast iron is that, as a consequence of the production techniques, the castings have relatively large shape and dimension tolerances and, moreover, a ledeburitic casting skin of a thickness of at least approximately 1.5 mm. The finer shaped portions of the disc brake, such as screw-passage holes or heat-insulating groove (s) cannot be produced directly by casting, but have to be machined in these grey cast iron brake discs. In view of the high shape inaccuracies and on account of the casting skin, all the surface parts of the brake disc have to be machined by cutting either to achieve the smaller dimension and shape tolerances required or to remove the casting skin, this being possible only in several different chucking operations in the machine tools.

Since residual stresses of the grey cast iron casting are released by turning off the casting skin on a lathe, the workpiece warps after an uppermost material layer has been removed in a so-called roughing cut step. Thus the narrower dimension and shape tolerance required cannot yet be achieved by means of the roughing cut. On the contrary, the warps have to be removed in a second machining operation finishing cut step, so that the desired shape accuracy can be achieved. The outcome of all this is that considerable machining oversize has to be reserved on the casting, and this has to be removed again in costly multi-stage cutting operations. This drives up costs to a considerable extent. Moreover, the multi-stage cutting machining, with rechucking at least once during finish machining alone, is detrimental to the machining accuracy which has to be compensated by an increased outlay in terms of machinery, this being possible, moreover, only in part. The assembly and balancing accuracy of the brake disc is impaired thereby.

An object of the invention is to improve a brake disc of the above-noted type to the effect that the manufacturing outlay for the brake disc is reduced and the manufacturing accuracy is at the same time increased.

This object is achieved according to preferred embodiments of the invention by providing a brake disc in the form of a unitary die cast annular brake disc member including a radially extending friction ring having axially facing friction surfaces engageable in use with a vehicle braking member, an annular nave disposed radially inwardly of the friction ring, and radially extending workpiece holder engaging sections on said nave at a position axially spaced from the friction ring.

By the choice of material according to the invention, which is suitable for brake discs and which has different casting properties from grey cast iron, inaccurate sand casting or chill casting can be abandoned and, instead, the substantially more accurate die casting method can be employed, making it possible to produce almost all the surface parts with the dimension and surface tolerance required already in the casting, so that cutting machining is largely superfluous.

In accordance with preferred embodiments of the invention, the use of castable light metal as the material for the brake discs avoids any harmful or troublesome outer casting skin which would have to be removed. Only the surfaces subjected to frictional stress still have to be machined by cutting, with the removal of a very small chip, so that the high dimension and shape accuracy and surface quality required here are achieved. Residual stresses originating from inside the casting are consequently not released and the casting does not warp. Furthermore, because of the flange projecting from the nave on the outside, this cutting operation can be performed in a single chucking position. This cutting operation is not only very simple and inexpensive, but also very accurate machining is thereby achieved.

In especially preferred embodiments of the invention, the material of the brake disc is made of a particle reinforced composite aluminum material with intercalcated hard-material particles of ceramic, particularly of aluminum oxide or silicon carbide (so-called Al-MMC=Aluminum Metal-Matrix-Composite) and/or of a hypereutectic Al/Si alloy with intercalated silicon crystals. These materials facilitate a die-casting production with close tolerance.

The preferred embodiments of the invention result in various combinations of the following advantages:

(i) On account of the aluminum material used and of the die casting method thereby made possible, high efficiency in the production of the brake-disc blank parts is attained, this leading to considerable cost reduction in comparison with brake-disc blanks made of grey cast iron.

(ii) Most surface parts of the brake disc, even of a finer nature, can be produced directly in the dimension and shape tolerance required by casting, so that, to that extent, cutting machining can be dispensed with.

(iii) The very small fraction of volume to be cut has a cost-reducing effect on the casting, because the blank weight can be kept lower.

(iv) All lathe cutting machining operations can be executed in a single workpiece chucking, this having a favorable effect on the machinery required, that is to say on the investment costs; only one lathe is needed.

(v) The insignificant cutting machining operations, which can be carried out quickly, allow short cycle times and therefore high productivity.

(vi) The once-only workpiece chucking during cutting machining ensures, without appreciable outlay in terms of machinery, high machining accuracy and therefore high through-running and balancing accuracy, which means a low outlay for the complete balancing of the brake discs or smaller residual unbalances.

(vii) Owing to the smaller residual unbalances which, in any case, are also small in terms of their absolute magnitude on account of the lightweight material, advantages in the use of the brake disc in the vehicle are afforded.

(viii) Owing to the low weight of the brake disc consisting of a lightweight material, the unsprung masses on the vehicle wheel are lower in comparison with a wheel having a grey-cast-iron brake disc, thus, on the one hand, increasing suspension comfort and, on account of the altogether lower vehicle weight, lowering the fuel consumption. Up to 50% of mass is saved on each brake disc in relation to a grey-cast-iron version; the weight advantage on the front brake discs is less than on the rear brake discs.

(ix) By virtue of the thermal conductivity of the aluminum material, which is higher than that of grey cast iron by the factor 4 to 5, the braking heat can be dissipated substantially more quickly, thus resulting in a higher thermal loading capacity of the brake disc. For this reason, after braking, the brake disc according to the invention cools again substantially more quickly than a grey-cast-iron disc.

(x) On account of the good heat dissipation, the temperature differences in the brake disc when it is subjected to braking are smaller than those of a greycast-iron disc under comparable operating conditions, so that the thermally induced component warps are also correspondingly lower, this likewise being an advantage in use which is not to be underestimated.

(xi) The efficiently and accurately castable light metal used and the die casting method employed make it possible to cast, on the outer circumference of the nave, ribs which not only have a stiffening effect on the brake disc, but are also conducive to a discharge of braking heat into the environment.

(xii) In the light of the lower expected temperature level of the brake disc, it is possible to provide for the brake caliper a less thermally stable light-metal construction which once again allows a reduction in the weight of the unsprung masses, thereby improving suspension comfort and fuel consumption.

(xiii) In conjunction with a casting-related greater freedom of design on the die casting, the smaller thermal warps also have the effect that the extent of the more or less avoidable so-called umbrella formation of the friction ring remains insignificant.

(ix) Furthermore, thanks to the easily castable light metal used and to the accurately working die casting method, further filigree contours, such as drainage bores or drainage flutes in the frictional surface or heat stop bores or heat stop grooves can also be produced directly by casting, that is to say without cutting machining. this having a beneficial effect on the production costs and use value of the brake disc.

Other objects, advantages and novel features of the present invention will become apparent from the following detailed description of the invention when considered in conjunction with the accompanying drawings.

BRIEF DESCRIPTION OF THE DRAWINGS

FIG. 3 is a schematic view showing the chucking of the brake disc according to FIGS. 1 and 2 for the cutting machining of the brake surfaces.

DETAILED DESCRIPTION OF THE DRAWINGS

Figure 1:
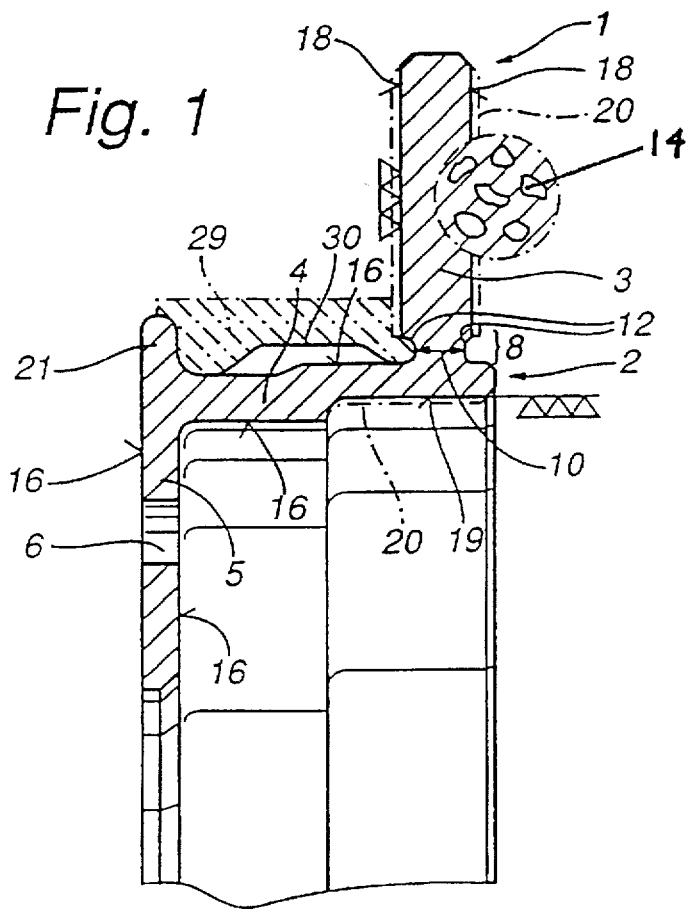
FIG. 1 shows a cross-section through a first exemplary embodiment of a brake disc, constructed according to the invention schematically indicating the shaping by casting of the concealed heat-insulating groove by means of a core ring.

The figures represent various exemplary embodiments of a one-part hat-shaped annular cross-section brake disc 1, 1' made from a castable metal for vehicle wheels. In the chosen examples, the brake discs consist of a nave 2, 2' and of a friction ring 3, 3'. The friction ring extends in an axis-perpendicular plane, and the nave is arranged radially within the friction ring. The nave itself has an approximately cylindrical nave casing 4 and a nave bottom 5 which is offset axially and radially relative to the friction ring 3 and likewise extends in an axis-perpendicular plane and which has screw-passage holes 6 for screwing the brake disc 1, 1' to a wheel-hub flange 7.

In the root region of the friction ring, where the latter merges into the nave casing, a smaller material crossection—axial wall thickness 10—is provided than corresponds to the axial wall thickness of the friction ring in the remaining region. The cross-sectional reduction is brought about by at least one annular-groove shaped, at least approximately axially oriented, rounded out recess in the material—heat-insulating groove 12 of empirically determined and optimized cross-sectional shape. With a suitable size and cross-sectional shape of the heat-insulating groove (s), an umbrella-like, thermally induced warping of the friction ring during the braking operation can be prevented or at least minimized. Insofar as only one heat-insulating groove is provided, this is made at least on the nave side of the friction ring.

In conventional grey cast-iron brake discs, all the surface parts have to be machined by cutting in order to remove the ledeburitic casting skin and to produce the brake disc with the prescribed small shape and dimension tolerances, this being possible only in several workpiece-chucking operations. This in turn involves high costs and reduces the manufacturing accuracy. In order to reduce the manufacturing outlay for the brake disc and at the same time increase manufacturing accuracy, the following measures are provided according to especially preferred embodiments of the invention.

The brake disc 1, 1' consists completely, up to and including that immediate surface 18 of the friction ring 3, 3' which is subjected to frictional stress during braking, of a particle-reinforced composite aluminum material with intercalated hard-material particles 14 of ceramic, particularly of aluminum oxide or silicon carbide (so-called Al-MMC= Aluminum-Metal-Matrix Composite). In the case of Al-MMC, the intercalated particles can be made as powder, that is to say cubic and/or in fibre form. In a material variant, the brake disc can consist alternatively or additionally of a hypereutectic Al/Si alloy with intercalated silicon crystals. The brake disc is designed and produced as a die casting, all the surface parts 16 of the casting being cast with a shape and dimension deviation of less than +0.05 mm. This is possible by means of specific die casting methods, so that most surface parts of the brake disc are already finished after casting. In the case of smaller dimensions, even a tolerance of approximately 0.03 mm can be maintained. In this respect, mention may be made, above all, of the screw-passage bores 6, the large central centering orifice in the nave bottom 5 and the cross-sectional shape of the heat-insulating groove 12. For the large centering bore in the nave bottom, a diameter accuracy within the limits of +0.074/−0.0 mm (H9) is demanded, and a deviation of at most 0.1 mm for the planeness of the nave bottom. This can presumably be guaranteed without a high reject rate by means of the above-mentioned die casting method.

Only for the two opposite frictionally stressed surfaces 18 of the friction ring 3, 3' and the frictionally-stressed hollow-cylindrical brake surface 19 inside the nave 2, 2' is an even smaller shape and dimension deviation demanded than that mentioned above. These surface parts are therefore machined by cutting. The bearing surface of the nave bottom 5 relative to the wheel-hub flange 7 can, if necessary, also be machined in the chucking described further below. For the purpose of a cutting machining of the said surface parts, a small machining addition 20 is provided on the casting in the region of the surface parts to be machined. So that the brake disc can be clamped in a workpiece holder 23 with little warping and in such a way that all the surface parts to be machined can be reached in a single chucking, a radially projecting flange 21 (FIG. 1) or a crown or ring of beads 22 (FIG. 2) extending in the circumferential direction is arranged on the outside of the nave at the transition from the nave bottom 5 to the nave casing 4. By means of these, the brake disc can be secured axially in or on the workpiece holder during machining. See further below for more details of this.

Figure 2:
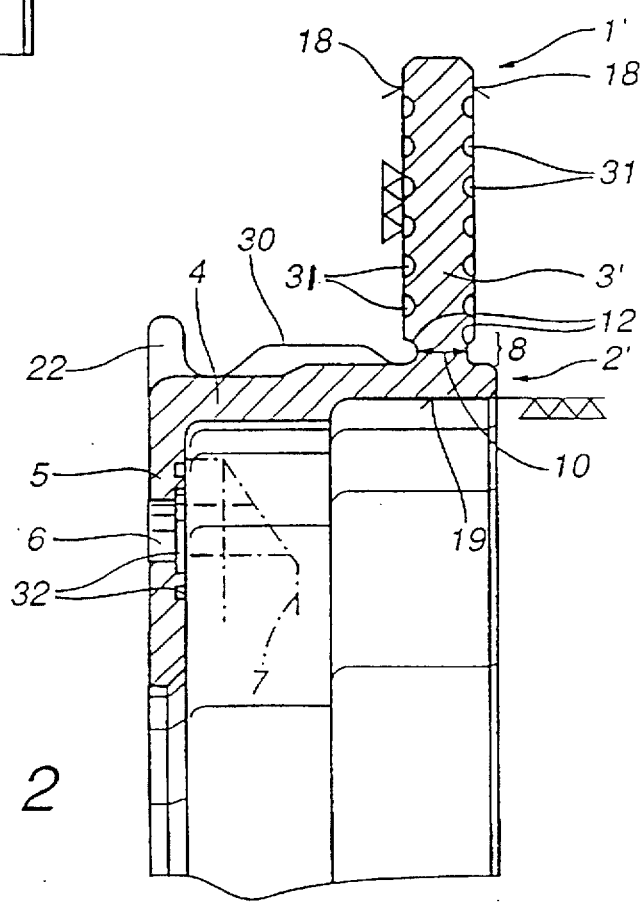
FIG. 2 shows a cross-section of a further exemplary embodiment of a brake disc according to the invention with drainage bores in the brake surfaces and with heat-insulating material offsets in the region of the screw passage holes of the nave bottom.

The circled dash line showing in FIG. 1 schematically depicts a section of the friction surface region in greatly enlarged form showing the particles 14.

One of the two heat-insulating grooves 12 are arranged in the root region 8 of the friction ring, namely the heat-insulating groove facing the flange 21 or the crown of beads 22, forms in casting terms an undercut which can be shaped only with difficulty. So that this undercutting heat-insulating groove can nevertheless be shaped in a die casting tool of uncomplicated design, the use of a core ring 29 is provided here, of which, during each workpiece casting, a new core ring is inserted into the die casting tool and which, after casting, is removed destructively from the cast workpiece. For the discharge of heat, radially outward-projecting, axially extending ribs 30 are formed on the outside of the nave 2, 2' and can likewise be shaped directly by means of the core ring 29. By virtue of these ribs 30, not only can the heat of the brake disc be discharged more quickly into the environment, but the ribs also have a shape-stabilizing effect.

So that, when the brake discs according to the invention are used in vehicles, full brakings from the maximum speed of the vehicles can also be executed safely, the material mass to be attributed in isolation to the friction ring 3, 3' must have a specific minimum size, so that no material overheating occurs during the braking operation. On the other hand, for many other reasons, the brake disc is to be as light as possible. In the light of the material-dependent and mass-dependent heat-storage capacity of the friction ring, its material mass is made so large that, during full braking from maximum speed, the friction ring heats up at most to approximately 440° C.

For rapid drying of the brake surface during braking on a wet road, drainage flutes or drainage bores 31, into which moisture adhering to the surface can be swept, are provided in the two frictionally-stressed surfaces 18 of the friction ring 3'. In the brake disc according to the invention, these drainage orifices do not, as in grey-cast-iron discs, need to be worked in by machine cutting, which will be complicated, but can be jointly cast to a finished size, without extra cost, by means of the die casting methods employed according to the invention.

In order to keep a transfer of heat from the -hot - brake disc to the wheel-hub flange 7 as little as possible and to avoid heating the wheel bearings unnecessarily, material offsets 32 in the form of punctiform or linear clearances, that is to say, for example, in the form of blind bores or grooves of a depth of approximately 0.3 to 2 mm, are made on that side of the nave bottom 5 facing the wheel-hub flange 7 of the vehicle axle, in the region covering the wheel-hub flange. The surface of the nave bottom touching the wheel-hub flange directly is thereby reduced and a heat insulating air gap is created in the region of the material offsets 32. The material offsets are provided, above all, in the region of increased surface pressure, that is to say, above all, around the screw-passage holes 6. These material offsets too can be made efficiently and without additional outlay by the die casting method.

So that the two opposite surfaces 18 of the friction ring 3, 3' and the brake surface 19 can be machined by cutting in a single chucking, a special chucking of the brake disc in the workpiece holder 23 is provided. So that the brake disc can be clamped with little warping and securely on the side of the nave bottom 5, a radially projecting flange 21 (FIG. 1) or a crown of beads 22 (FIG. 2) extending in the circumferential direction is arranged, as mentioned, on the outside of the nave at the transition from the nave bottom 5 to the nave casing 4. By means of these, the brake disc can be secured axially in or on the workpiece holder during machining. The outer surface of the nave bottom is supported axially in a specific position in the region of the nave casing 4 via workpiece stops 26 located on the chucking tool and is centered radially on the inner edge of the central centering orifice in the nave bottom by means of a centering stud 25. Claws 24 engage over the flange 21 (or the beads 22) and, by means of guide pins 27, are pivotable and are axially displaceable under high force; however, the corresponding chucking and pivoting drive is not shown. By means of this type of outer clamping, a very low deformation of the brake disc is generated during chucking and, nevertheless, the workpiece is firmly held in a specific position.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. One-part hat-shaped brake disc made from a castable metal for vehicle wheels, with a nave which is arranged radially within a friction ring extending in an axis-perpendicular plane, which nave itself comprises an approximately cylindrical nave casing and a nave bottom which is offset axially and radially relative to the friction ring and likewise extends in an axis-perpendicular plane and which has screw-passage holes for screwing the brake disc to a wheel hub, the friction ring merging in its root region into the nave casing with a smaller material cross-section than corresponds to an axial wall thickness of the friction ring, the cross-sectional reduction being brought about by at least one annular-groove-shaped, axially oriented, rounded-out recess heat-insulating groove, said at least one heat-insulating groove including a groove on the nave side of the friction ring, wherein the brake disc consists completely, up to and including an immediate surface of the friction ring which is subjected to frictional stress during braking, of a particle-reinforced composite aluminum material with intercalated hard-material particles of ceramic, particularly of aluminum oxide or silicon carbide (so-called Al-MMC=Aluminum-Metal-Matrix-Composite) and/or of a hypereutectic Al/Si alloy with intercalated silicon crystals, wherein the brake disc is designed and produced as a die casting, all surface parts of the casting being cast with a shape and dimension deviation of less than +0.05 mm, only two opposite frictionally-stressed surfaces of the friction ring and, if present, a frictionally-stressed hollow-cylindrical brake surface inside the nave are machined by cutting with an even smaller shape and dimension deviation than +0.05 mm, and wherein a radially projecting flange or a ring of beads extending in the circumferential direction is arranged on the outside of the nave at the transition from the nave bottom to the nave casing, via which flange or beads the brake disc can be secured axially in or on a workpiece holder during machining.

2. Brake disc according to claim 1, wherein said at least one insulating groove includes two heat-insulated grooves provided at respective opposite axial sides of the friction ring, and wherein one of said heat insulating grooves faces the flange and is shaped by means of a core ring which can be newly inserted into a die casting tool during each workpiece casting and which is removable destructively.

3. Brake disc according to claim 1, wherein radially outward-projecting, axially extending ribs are formed on the outside of the nave.

4. Brake disc according to claim 1, wherein mass to be attributed in isolation to the friction ring is made so large in the light of its heat-storage capacity that, during full braking of an associated vehicle from its maximum speed, the friction ring heats up at most to approximately 440° C.

5. Brake disc according to claim 1, wherein drainage flutes or drainage bores are cast in each case into the two frictionally-stressed surfaces of the friction ring.

6. Brake disc according to claim 1, wherein punctiform or linear clearances in the form of material offsets or grooves of a depth of approximately 0.3 to 2 mm are made on that side of the nave bottom facing a wheel-hub flange of the vehicle axle and in the region covering the wheel-hub flange, the said clearances reducing the surface of the nave bottom touching the wheel-hub flange directly and creating a heat-insulating air gap in the region of the material offsets or grooves.

7. Brake disc according to claim 6, wherein the material offsets or grooves are provided, above all, in a region of increased surface pressure, that is to say, above all, around the screw-passage holes.

8. One-part hat-shaped brake disc made from a castable metal for vehicle wheels, with a nave which is arranged radially within a friction ring extending in an axis-perpendicular plane which nave itself comprises an approximately cylindrical nave casing and a nave bottom which is offset axially and radially relative to the friction ring and likewise extends in an axis-perpendicular plane and which has screw-passage holes for screwing the brake disc to a wheel hub, the friction ring merging in its root region into the nave casing with a smaller material cross-section than corresponds to an axial wall thickness of the friction ring, the cross-sectional reduction being brought about by at least one annular-groove-shaped, axially oriented, rounded-out recess heat-insulating groove, said at least one heat-insulating groove including a groove on the nave side of the friction ring, wherein the brake disc consists completely, up to and including an immediate surface of the friction ring which is subjected to frictional stress during braking, of a particle-reinforced composite aluminum material with intercalated hard-material particles made as powder of Al-MNC, that is to say cubic and/or in fibre form, wherein the brake disc is designed and produced as a die casting, all surface parts of the casting being cast with a shape and dimension deviation of less than +0.05 mm, only two opposite frictionally-stressed surfaces of the friction ring and, if present, a frictionally-stressed hollow-cylindrical brake surface inside the nave are machined by cutting with an even smaller shape and dimension deviation than +0.05 mm, and wherein a radially projecting flange or a ring of beads extending in the circumferential direction is arranged on the outside of the nave at the transition from the nave bottom to the nave casing, via which flange or beads the brake disc can be secured axially in or on a workpiece holder during machining.

9. A brake disc in the form of a unitary die cast annular brake disc member comprising:

a radially extending friction ring having axially facing friction surfaces engageable in use with a vehicle braking member, an annular nave disposed radially inwardly of the friction ring, and radially extending workpiece holder engaging sections on said nave at a position axially spaced from the friction ring and configured to facilitate holding of said brake disc without limiting work tool access to the friction ring surfaces of the friction ring, said workpiece holder engaging sections extending perpendicular to an axis of said brake disc.

10. A brake disc according to claim 9, wherein said workpiece holder engaging sections are on an annular support flange.

11. A brake disc according to claim 10, wherein said annular support flange is at one axial end of the brake disc member, and said friction ring is at an opposite axial end of the brake disc member.

12. A brake disc according to claim 9, wherein said holder engaging sections include a plurality of radially extending beads.

13. A brake disc according to claim 12, wherein said beads are at one axial end of the brake disc member, and said friction ring is at an opposite axial end of the brake disc member.

14. A brake disc according to claim 9, comprising an annular cooling groove disposed at a junction section of the annular nave and the friction ring.

15. A brake disc according to claim 14, wherein said annular cooling groove is at an axial side of a friction groove which faces said workpiece holder engaging sections.

16. A brake disc according to claim 9, wherein said brake disc member is made entirely of one of an aluminum-metal-matrix composite and a hypereutectic Al/Si alloy with intercalated silicon crystals.

17. A brake disc according to claim 9, wherein radially outward-projecting, axially extending ribs are formed on the outside of the nave.

18. A method of making a brake disc comprising:

die casting a unitary annular brake disc member in a shape including:

a radially extending friction ring having axially facing friction surfaces engageable in use with a vehicle braking member, an annular nave disposed radially inwardly of the friction ring, and radially extending workpiece holder engaging sections on said nave at a position axially spaced from the friction ring, and configured to facilitate holding of said brake disc without limiting work tool access to the friction ring surfaces of the friction ring, said workpiece holder engaging sections extending perpendicular to an axis of said brake disc, said method comprising:

holding the cast disc member in a workholder engaging the holder engaging sections while performing finish machining operations on braking surfaces of the friction ring.

19. A method according to claim 18, wherein said brake disc member is made entirely of one of an aluminum-metal-matrix composite and a hypereutectic Al/Si alloy with intercalated silicon crystals.

20. A brake disc according to claim 19, wherein said die casting includes die casting radially outward-projecting, axially extending ribs on the outside of the nave.

* * * * *